US008113743B2

(12) United States Patent
Straus et al.

(10) Patent No.: US 8,113,743 B2
(45) Date of Patent: Feb. 14, 2012

(54) EARTH-WORKING APPARATUS AND METHOD FOR WORKING ENCRUSTED EARTH

(75) Inventors: Reinhold Straus, Mosbach (DE); Martin Straus, Mosbach (DE)

(73) Assignee: LOBBE Industrieservice GmbH & Co KG, Iserlohn (DE)

( * ) Notice: Subject to any disclaimer, the term of this patent is extended or adjusted under 35 U.S.C. 154(b) by 116 days.

(21) Appl. No.: 12/228,443

(22) Filed: Aug. 13, 2008

(65) Prior Publication Data
US 2009/0294142 A1 Dec. 3, 2009

(30) Foreign Application Priority Data
May 28, 2008 (DE) .................. 10 2008 002 038

(51) Int. Cl.
*E02D 3/00* (2006.01)
(52) U.S. Cl. ...................................... 405/241
(58) Field of Classification Search ............ 37/244–269, 37/189; 172/48, 60, 25, 108, 106, 110–125, 172/449, 451; 111/113; 175/170, 203, 51; 405/266–269, 258, 303, 236, 237, 240–243, 405/233, 263
See application file for complete search history.

(56) References Cited

U.S. PATENT DOCUMENTS

| | | | | |
|---|---|---|---|---|
| 2,394,771 A | 2/1946 | Hill | ................................ | 97/43 |
| 2,574,237 A | 11/1951 | Barrow | ............................. | 97/43 |
| 3,023,585 A | 3/1952 | Liver | ................................ | 61/36 |
| 2,783,974 A * | 3/1957 | Veasman | ........................ | 175/384 |
| 3,207,230 A | 9/1965 | Raussendorf | .................... | 172/67 |
| 3,543,861 A | 12/1970 | Takakita | ........................ | 172/66 |
| 3,667,551 A | 6/1972 | van der Lely et al. | .......... | 172/59 |
| 4,671,367 A * | 6/1987 | Brunsing et al. | ................ | 175/58 |
| 4,844,839 A | 7/1989 | Manchak, Jr. | ................ | 252/633 |
| 4,902,172 A | 2/1990 | Fukuda | .......................... | 405/269 |
| 5,006,016 A | 4/1991 | Fukuda | .......................... | 405/240 |
| 5,295,769 A * | 3/1994 | Sano | ............................. | 405/266 |
| 5,304,016 A * | 4/1994 | Kunito | .......................... | 405/233 |
| 5,645,376 A * | 7/1997 | Taki | ............................. | 405/241 |
| 6,662,880 B2 * | 12/2003 | Manor | ............................ | 172/48 |

FOREIGN PATENT DOCUMENTS

| | | |
|---|---|---|
| DE | 82 15 217 U | 10/1982 |
| DE | 37 23 140 C2 | 2/1988 |
| DE | 40 03 362 A1 | 8/1991 |
| DE | 44 05 303 | 9/1995 |
| DE | 195 29 439 | 11/1996 |
| EP | 0 891 305 B1 | 7/2001 |

* cited by examiner

*Primary Examiner* — Robert Pezzuto
(74) *Attorney, Agent, or Firm* — Davidson, Davidson & Kappel, LLC

(57) ABSTRACT

An earth-working apparatus (1) having a drive (1', 1") located above the ground is described. The earth-working apparatus has at least two earth-working devices (300, 400), a first earth-working device (300) including a rotating cutter and agitator device (30) that penetrates into the ground to be worked, having first tools and a second earth-working device (400) including a comminuting device (40) having second tools. Each earth-working device (300, 400) is individually mountable on the drive. The earth-working devices (300, 400) may be individually mountable on the drive. It is also possible to combine two or more earth-working devices and to mount them together on the drive. A method for working particularly encrusted ground surfaces is also described.

49 Claims, 13 Drawing Sheets

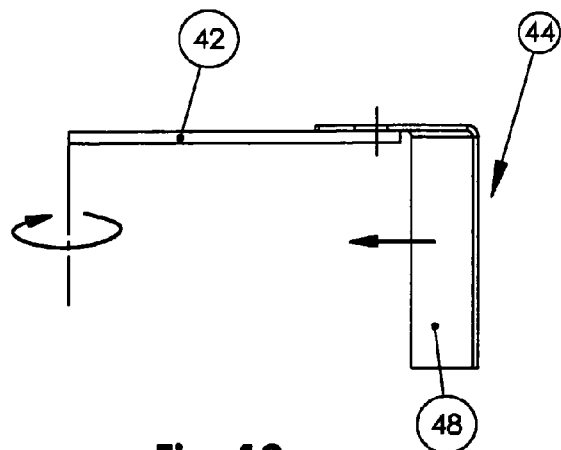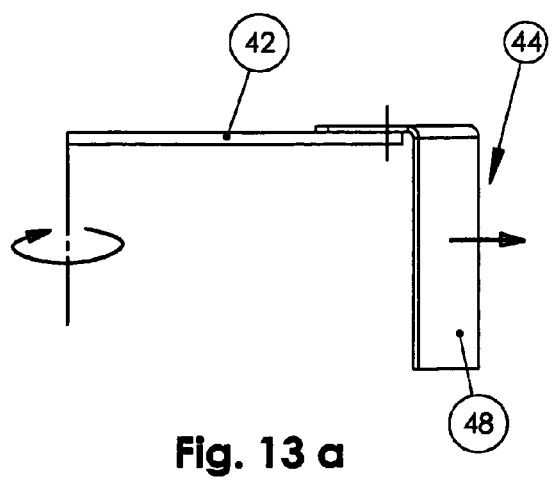
Fig. 12 a  Fig. 13 a
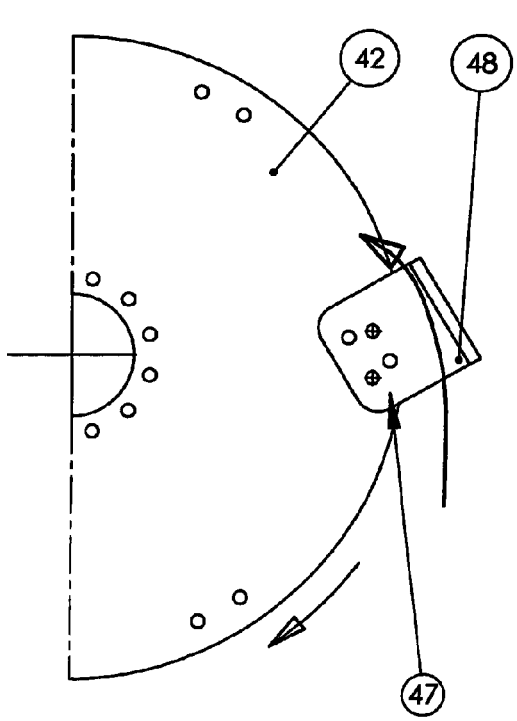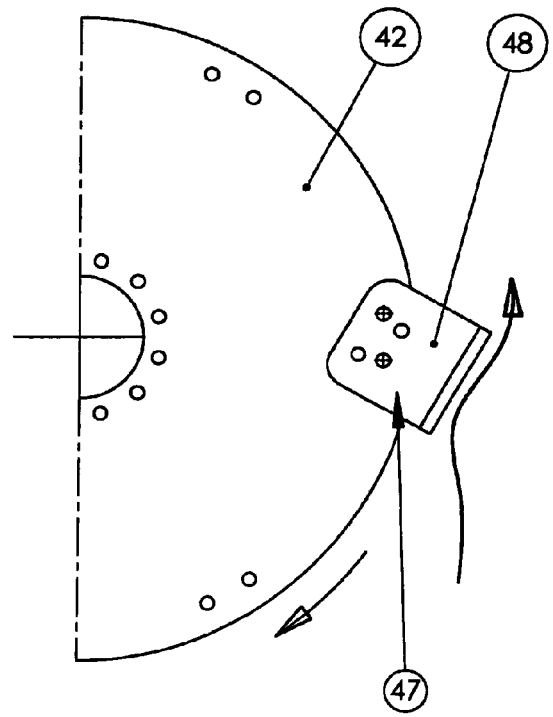
Fig. 12 b  Fig. 13 b

EARTH-WORKING APPARATUS AND METHOD FOR WORKING ENCRUSTED EARTH

This claims priority of German Patent Application No. 10 2008 002 038.9, filed on May 28, 2008, the entire disclosure of which is hereby incorporated by reference herein.

The present invention relates to an earth-working apparatus, as well as to a method for working encrusted earth.

BACKGROUND OF THE INVENTION

In the field of decontamination of contaminated soils, various methods are known, microorganisms and, in some instances, nutrient solutions that promote the action of the microorganisms, typically being introduced into the earth. Thus, earth-working apparatuses, which include a cutter and agitator having angled vanes, are known from the German Patents DE 44 05 303 C1 and DE 195 29 439 C1, for example, it being a question of a specific vane configuration to obtain a desired comminution of the earth.

The vane configuration is selected to allow the earth picked up by the particular vane to be lifted due to the angular position thereof, crumbled, and to fall again behind the vanes, facilitated by a suitable free space provided therebetween. At the same time, underneath the vanes, a hollow space is formed in which the desired microorganisms, suspensions, nutrient solutions, granular material or the like can be introduced in a substantially unhindered manner through the outlet orifices located in the hollow shaft underneath the vane. The mentioned materials are also referred to as conditioning agents.

From the European Patent Specification EP 0 891 305 B1, a method is known for solidifying large quantities of pasty masses, such as sludge, marshy soil or tar, which provides for mixing at least one conditioning agent with the pasty masses. The method provides that the pasty masses located in a natural or artificial basin be set in motion on site within locally bounded regions, and that at least one conditioning agent be introduced while being simultaneously intermixed with the pasty mass, the conditioning agent being supplied directly to the work site from a storage tank located outside or inside of the basin. The conditioning agent is introduced by an earth-working apparatus underneath the surface of the pasty mass and is uniformly distributed both vertically, as well as horizontally, continuously over a predefined depth. In this case, the earth-moving apparatus is moved in the forward direction and orthogonally thereto.

In processes for conditioning tar lakes, for example, it turns out that the known earth-working apparatuses are used to effectively mix the tar with the conditioning agents in the area where the tar is in a dough-like state. However, over time, tar lakes, in the same way as other pasty masses, form a crust of greater or lesser hardness and thickness due to densification and drying-out processes at the surfaces thereof.

Upon penetration by an earth-working apparatus, this crust is broken up, thereby forming coarse clods on the one hand, and cracks and fractures in the immediate surrounding area. An undesirable and unintentional consequence is that the conditioning agent introduced under positive pressure can escape through these cracks up through the earth and thus contribute to environmental pollution. After removing and hauling away the contaminated material, it is then necessary to further condition the course clods at another location in order to treat and, in some instances, incinerate the material.

SUMMARY OF THE INVENTION

It is, therefore, an object of the present invention to devise an earth-working apparatus that will make it readily possible, in particular, for encrusted earth to be worked and fully treated.

In accordance with an embodiment of the present invention earth-working apparatus is provided including a drive located above the ground, and at least two earth-working devices; a first earth-working device including a rotating cutter and agitator device that penetrates into the ground to be worked, and having first tools, and a second earth-working device including a comminuting device having second tools.

Earth and earth material are understood to be not only soil, but all types of crumbly or pasty masses, such as also sludges and tars which are contained in artificial or natural basins or are collected, and which are to undergo a treatment prior to a further processing.

In accordance with a first specific embodiment, the earth-working devices are individually mountable on the drive. It is possible to first break up the crust using a cutter and agitator device, to subsequently exchange the cutter and agitator device for a comminuting device, and to grind and crush the earth, in particular the clods. Since the second operation may be carried out independently of the first, it is more readily adaptable, from a temporal perspective as well, to the constitution and size of the clods.

The same driving device may be utilized for both work operations. To facilitate the interchanging of the machining device, corresponding, releasable attachment means are provided both on the driving device, as well as on the individual earth-working devices. Thus, the earth-working apparatus includes at least one driving device having an optional gear transmission, and one set of earth-working devices.

A second specific embodiment provides for the at least two earth-working devices to be jointly mounted on the drive. This specific embodiment advantageously enables both work operations to be carried out simultaneously, thereby saving time. This requires that the drive has a more rugged design than in the case of the first specific embodiment.

The earth-working apparatus has at least two different tool assemblies, i.e., first and second tool assemblies. These different tool assemblies fulfill different tasks.

The first tool assemblies are preferably cutter and agitator tools which are designed to penetrate into the ground and to thoroughly mix the earth material.

The second tool assemblies are preferably percussive tools for smashing and crushing large clumps of earth that, for example, have been broken out of the ground by the first tool assemblies, have not been picked up by the first tool assemblies, or were not able to be crushed by the first tool assemblies due to the design thereof.

By providing at least two different tool assemblies, at least two work operations are able to be carried out into the earth material. The at least two different tool assemblies are configured at two different locations on the earth-working apparatus, thereby making it possible for at least one portion of the earth material to be subject to at least two work operations in temporal succession. In the case of substantially encrusted ground surfaces, coarse clumps or clods are broken out of the crust by the first tool assemblies in a first work operation and crushed by the second tool assemblies in a second work operation.

The comminuting device is preferably mounted above the cutter and agitator device. The second tools of the comminuting device may be configured entirely above the first tools. Depending on the ground conditions, it may be expedient for the second tool assemblies to be designed and configured to extend into the region of the first tool assemblies. Since $D_2$ is $>D_1$, the second tool assemblies may be mounted radially adjacently to the first tool assemblies. The comminuting device is preferably likewise a rotating device.

The cutter and agitator device has a first effective diameter $D_1$, and the comminuting device has an effective diameter $D_2$.

The effective diameter denotes the respective outer diameter of the tools of the rotating device in question that move on a circular path.

$D_2$ is preferably $>D_1$.

When used for working encrusted ground surfaces, the cutter and agitator device, which penetrates into the ground, breaks up the crust, thereby forming coarse clumps or clods which are thrown upwards and thus escape the treatment intended therefor. A mixing with a conditioning agent is then no longer able to take place, for example.

Clods of this kind are effectively picked up and crushed by the comminuting device mounted above the cutter and agitator device. It turns out that the clods are not only thrown up vertically, but also horizontally as well, out of the effective range of the cutter and agitator device. Virtually all of the clods are picked up since effective diameter $D_2$ of the comminuting device is selected to be larger than effective diameter $D_1$ of the cutter and agitator device.

Depending on the type and thickness of the crust material, effective diameter $D_2$ is to be selected. The ratio is preferably within the range of $1.5 \leq D_2/D_1 \geq 2.5$, in particular within the range of 1.8 to 2.2.

The cutter and agitator device preferably has first tool assemblies which rotate about a common axis.

The first tool assemblies preferably rotate about a vertical axis.

The comminuting device preferably has second tool assemblies which likewise rotate about at least one common axis.

The common axis of the second tool assemblies is also preferably a vertical axis.

Vertical axes of rotation are preferred because the earth-working apparatus is typically introduced into the ground from above.

Depending on the ground conditions, axes that are inclined from the vertical may also be advantageous, as are combined motions of the devices as well, such as rotations about two or more axes, which expand the effective range of the earth-working apparatus.

The first and second tool assemblies may rotate in opposite directions about their shared axis, for example. However, the drive of the two devices may be simplified by a configuration whereby the first and second tool assemblies preferably rotate in the same direction.

In this specific embodiment, the cutter and agitator device and the comminuting device may be mounted on a common shaft.

The conditioning agent may be spread over the ground to be worked and mixed in by the earth-working apparatus.

Another preferred specific embodiment provides that at least one conditioning agent be discharged within the earth via the cutter and agitator device.

To that end, the shaft is preferably a hollow shaft via which the conditioning agent may be supplied. The conditioning agent is discharged through appropriate discharge orifices in the area of the cutter and agitator device or the comminuting device.

The first tool assemblies preferably include angled vanes which are mutually spaced apart in the circumferential and longitudinal direction of the shaft.

The vanes are preferably configured on a helix, at least two vanes being provided per helical turn. The vanes preferably have an angular position of 20° to 30°.

The vanes are oriented relative to the rotational direction of the shaft to allow excavation of the earth. This simplifies the process of mixing the earth material with the conditioning agent.

The cutter and agitator device preferably has discharge orifices, in particular underneath the vanes, for discharging conditioning agent. The discharge orifices may additionally be provided with spray nozzles. This specific embodiment is advantageous when liquid conditioning agent is to be discharged.

The comminuting device preferably includes at least one supporting element on which at least one second tool is mounted.

The supporting element is preferably a plate that is configured relative to the vertical shaft, for example, thus horizontally. Here the advantage is derived that a plate holds back rising dust, which in some instance may also contain conditioning agent. Moreover, a rotating plate has a substantial centrifugal mass which has a beneficial effect on the crushing of large clods.

The second tools are preferably attached to the bottom side and/or to the rim of the plate. In the case of a rim mounting, the second tools may also be attached to the top side of the plate.

The second tool preferably extends downward from the supporting element.

In accordance with one special specific embodiment, a plurality of second tools, which are configured within at least one effective diameter ($D_2$, $D_2'$) and/or at least one effective depth ($T_1$, $T_2$), are provided on the supporting element. To realize various effective diameters, the second tools are attached to the supporting element over two or more circles. In this connection, the second tools may have different lengths, for example, thereby making different effective depths $T_1$, $T_2$, $T_3$ attainable. Second tools having different effective depths $T_1$ and $T_2$, etc. may also be configured on one circle.

The tools are preferably configured and designed for an inward and/or outward conveying direction relative to the axis of rotation. The inward conveyance design is preferably selected when it suffices for the clods to contact the second tool. The advantage of the inward conveyance design is that, on the one hand, the smashed fragments of a clod are carried to the inner mixing region and, on the other hand, due to the centrifugal forces, they repeatedly come in contact with the second tools.

The second tool preferably has a spar and a blade.

The spar is preferably configured to slant outwardly from top to bottom.

The blade may be configured to slant in the vertical and/or horizontal direction. In the simplest case, the blade is made of a plate. The blade may also be a heart-shaped plate.

In accordance with another specific embodiment, the second tool may be a cutting edge.

The second tools are preferably releasably attached to the supporting element. Thus, depending on the ground conditions, the tools may be readily interchanged.

The second tool is directly or indirectly mounted on the supporting element via spacer elements. Here the advantage is derived that tools of one length may be used to achieve different effective depths.

At least the second tools are preferably made of a spring steel, which is particularly advantageous when the process entails working stony ground. The spring action allows such tools made of spring steel to give way to the stones more effectively.

In addition, a bell-shaped dust cover may be provided between the comminuting device and the drive means. The bell-shaped dust cover may be secured to the shaft or to the supporting element, as well. When secured to the supporting element, in particular the plate, it may suffice for the bell-shaped dust cover to merely be designed as a circumferentially extending skirt. In this context, the bell-shaped dust cover may have a certain self-cleaning feature that is effected by vibrations.

The lower rim of the bell-shaped dust cover preferably extends at most into the region of the lower rim of the comminuting device. Thus, within a limited range, the bell-shaped dust cover dips into the ground region, thereby very effectively preventing dust from forming in the vicinity of the earth-working apparatus.

The bell-shaped dust cover is preferably made of a flexible material. When flexible material, such as rubber or fabric, is used, it may be effectively adapted to the surface contour of the earth to be worked and thereby seal off the space underneath the supporting element more tightly.

At least one intermediate shaft is preferably configured between the cutter and agitator device and the comminuting device and/or between the comminuting device and the drive means. In this specific embodiment, the comminuting device and the cutter and agitator device are each mounted on shaft portions specific thereto. This creates a modular design which facilitates the process of interchanging the devices and of modifying the distance therebetween.

Means for attachment to a horizontally movable device are preferably provided.

In addition, the shaft may be configured to be tiltable from the vertical.

In accordance with another embodiment of the present invention a method for working encrusted ground surfaces, in particular tar lakes, the ground surface crust being broken up by an earth-working apparatus in a first work operation, and the earth material being set in motion within locally bounded regions, and the clods formed when breaking up the ground surface crust within the locally bounded region being crushed in at least one second work operation.

In accordance with one first specific embodiment, the operations may be carried out simultaneously. To this end, an earth-working apparatus is used which has at least two earth-working devices.

In accordance with one second specific embodiment, the operations may also be carried out in temporal succession. To this end, an earth-working apparatus is used which, at any one time, has only one earth-working device, the earth-working device preferably being mounted interchangeably on the drive means.

The first work operation may be carried out by a first earth-working device which is mounted on a first vehicle, for example an excavator. The second work operation is carried out by a second earth-working device which is mounted on a second excavator. In this case, two driving devices are required.

The material of the crushed clods is preferably delivered again to the mixing region.

Thus, the clods are crushed on site by the earth-working apparatus. The clods are crushed immediately after they are formed.

In accordance with one special specific embodiment, at least one conditioning agent is introduced while being simultaneously intermixed with the earth material, the conditioning agent being distributed in the vertical and/or horizontal direction.

The conditioning agent may be mixed in, in the first and/or second, respectively additional work operation.

BRIEF DESCRIPTION OF THE DRAWINGS

Exemplary embodiments are clarified in the following with reference to the drawing, whose figures show:

FIG. 12*a* a supporting plate including a tool in accordance with another specific embodiment;

FIG. 12*b* a plan view of the supporting plate having a tool in accordance with FIG. 12*a;*

FIG. 13*a* a supporting plate including a tool in accordance with another specific embodiment;

FIG. 13*b* a plan view of the supporting plate having a tool in accordance with FIG. 13*a;*

DETAILED DESCRIPTION OF THE DRAWINGS

Figure 1:
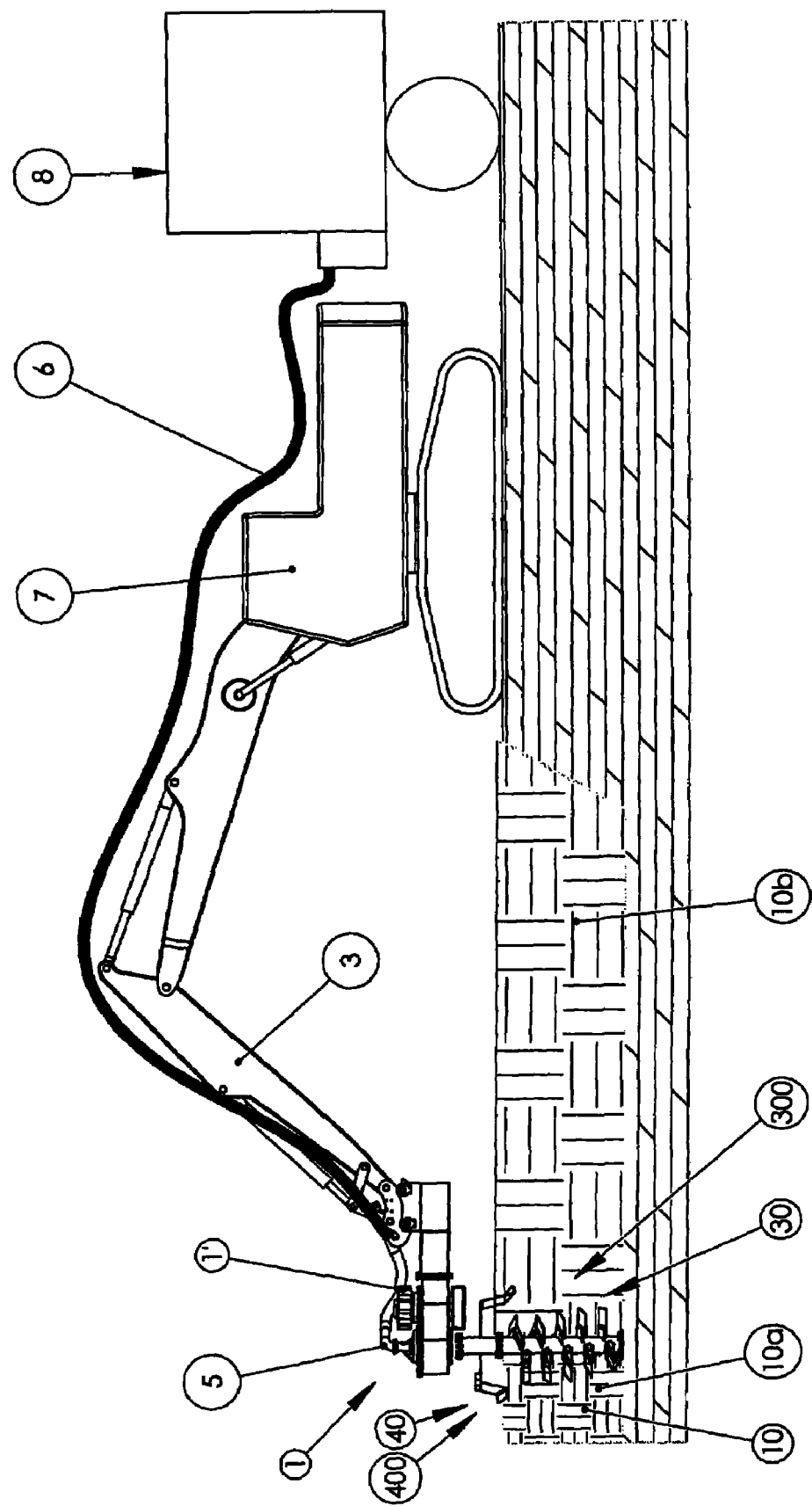
FIG. 1: a lateral view of an earth-working apparatus having an excavator and bulk transporter.

FIG. 1 shows an earth-working apparatus 1 having a first earth-working device 300 and a second earth-working device 400. Both earth-working devices 300, 400 are mounted in a combined configuration on driving device 1' (drive) and include a cutter and agitator device 30 and a comminuting device 40 situated above the same. It is discernible that earth-working apparatus 1 penetrates into ground 10 and works the earth material by the rotation of device 30 and of device 40. The worked area and the unworked area are marked by different hatchings.

Earth-working apparatus 1 is mounted on boom 3 of a driveable device 7. Driveable device 7 is illustrated in FIG. 1 as an excavator. Earth-working apparatus 1 is connected via a hose line 6 to a bulk transporter 8 which contains conditioning agent. The forward drive motion of earth-working apparatus 1 may be effected by a slewing motion of excavator 7. The forward drive motion may also be effected by the travel operation of excavator 7. It is also possible to combine the travel operation with a slewing motion.

Figure 2:
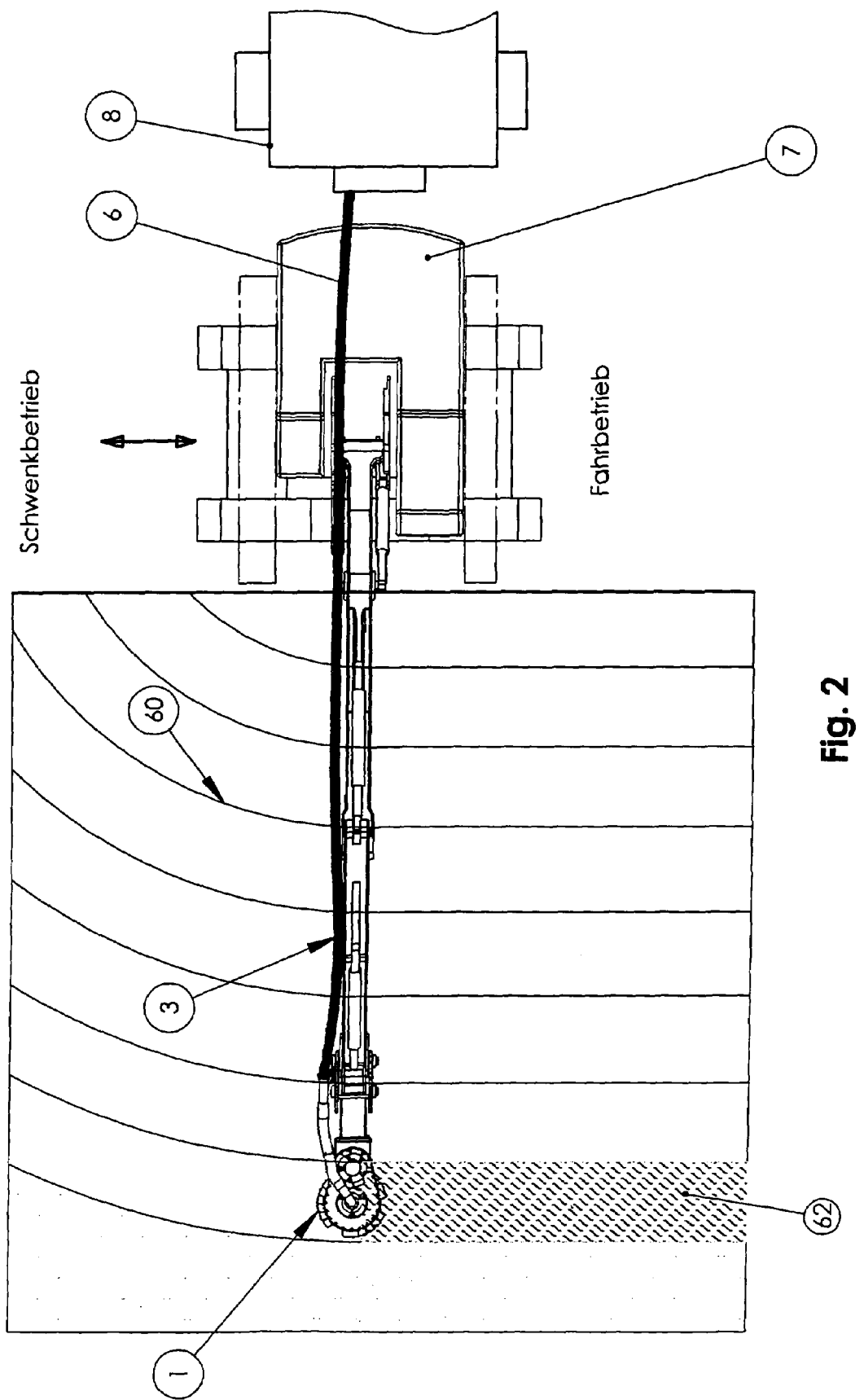
FIG. 2: a plan view of an earth-working apparatus having an excavator and bulk transporter in travel operation.

FIG. 2 shows a plan view of earth-working apparatus 1 including an excavator 7 and bulk transporter 8. Rectilinear, worked furrows 62 are produced by the lateral travel operation of excavator 7. Curvilinear furrows 60 may be produced by a slewing motion of the boom.

Figure 3:
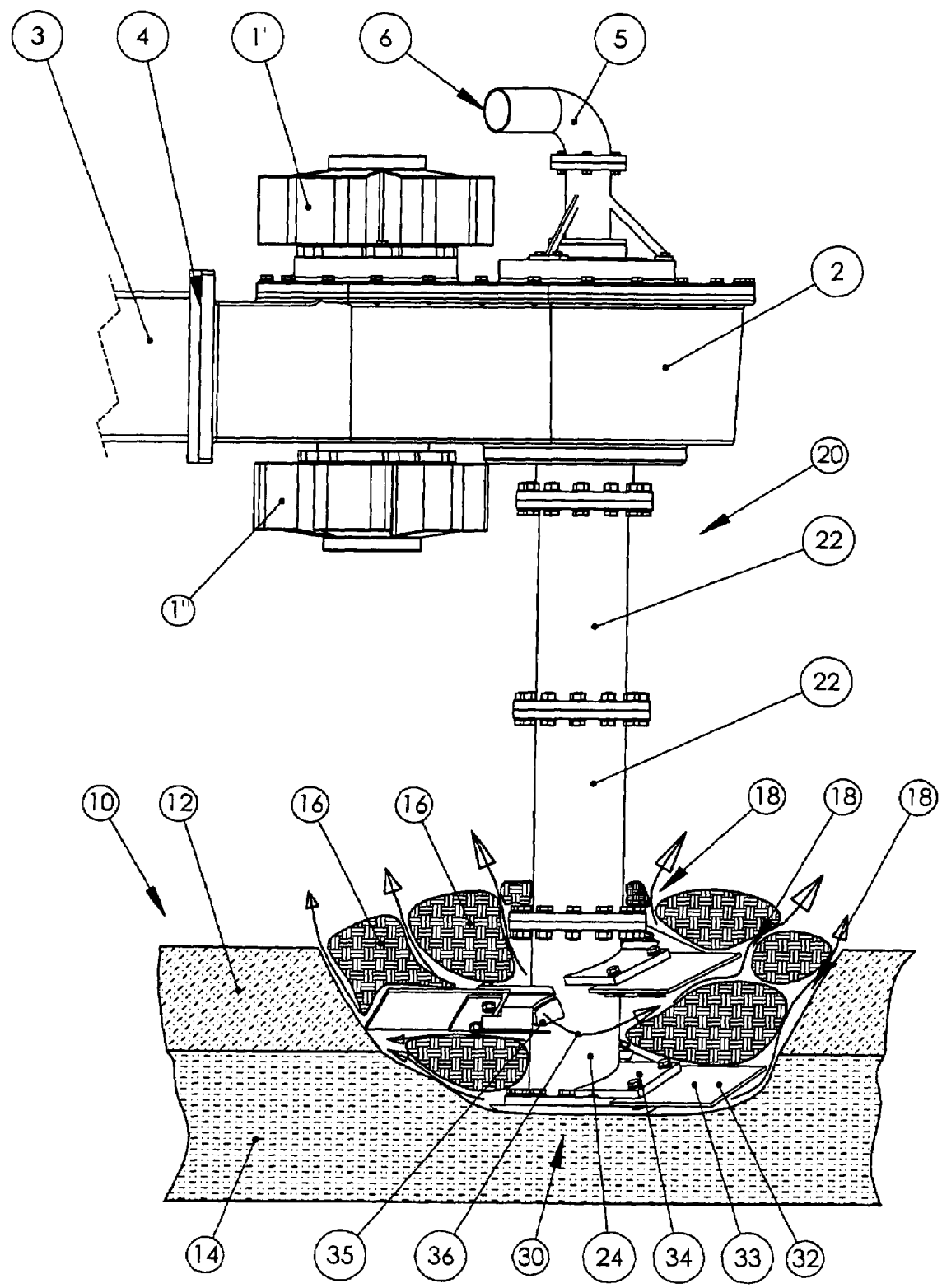
FIG. 3: a sectional view of furrows, including an earth-working apparatus in a lateral view without a comminuting device.

An earth-working apparatus 1 is shown in an enlarged lateral view in FIG. 3. To better illustrate the mode of operation of cutter and agitator device 30, comminuting device 40 has been omitted. Flange-mounted to boom 3 of the excavator via a flange mount 4 is reduction gear 2 which is driven by two hydraulic motors 1' and 1". Mounted on the top side of reduction gear 2 is feed line 5 for the conditioning agent to which hose line 6 is secured.

Disposed on the bottom side of reduction gear 2 is a shaft 20 which, in the illustration shown here, is made of three sections. Shaft 24 of cutter and agitator device 30 is installed on the bottom side via two intermediate shafts 22.

Mounted on shaft 24 are first tools 32, which are designed as vanes 33 and are secured to vane mounts 34. Provided on shaft 24 are vane mounts 34 to which vanes 33 are detachably secured via screw connections. Vanes 33 are configured on a type of helix about shaft 24 and have a slanting orientation, so that the earth material into which cutter and agitator device 30 penetrates is displaced upward.

Illustrated as an example in FIG. 3 is tar-contaminated soil 10, which, in the lower region includes dough-like material 14 and, thereabove, a crust 12. Upon penetration by earth-working apparatus 1, crust 12 is broken up by vanes 33, thereby forming clods 16.

Via orifices 35 in shaft 24 of cutter and agitator device 40, conditioning agent is discharged into the ground in flow direction 36 and is able to escape through the cracks and fractures 18 of broken-up crust 12. A homogeneous mixing of the conditioning agent with the earth material is not possible because clods 16 are still too large therefor.

Figure 4:
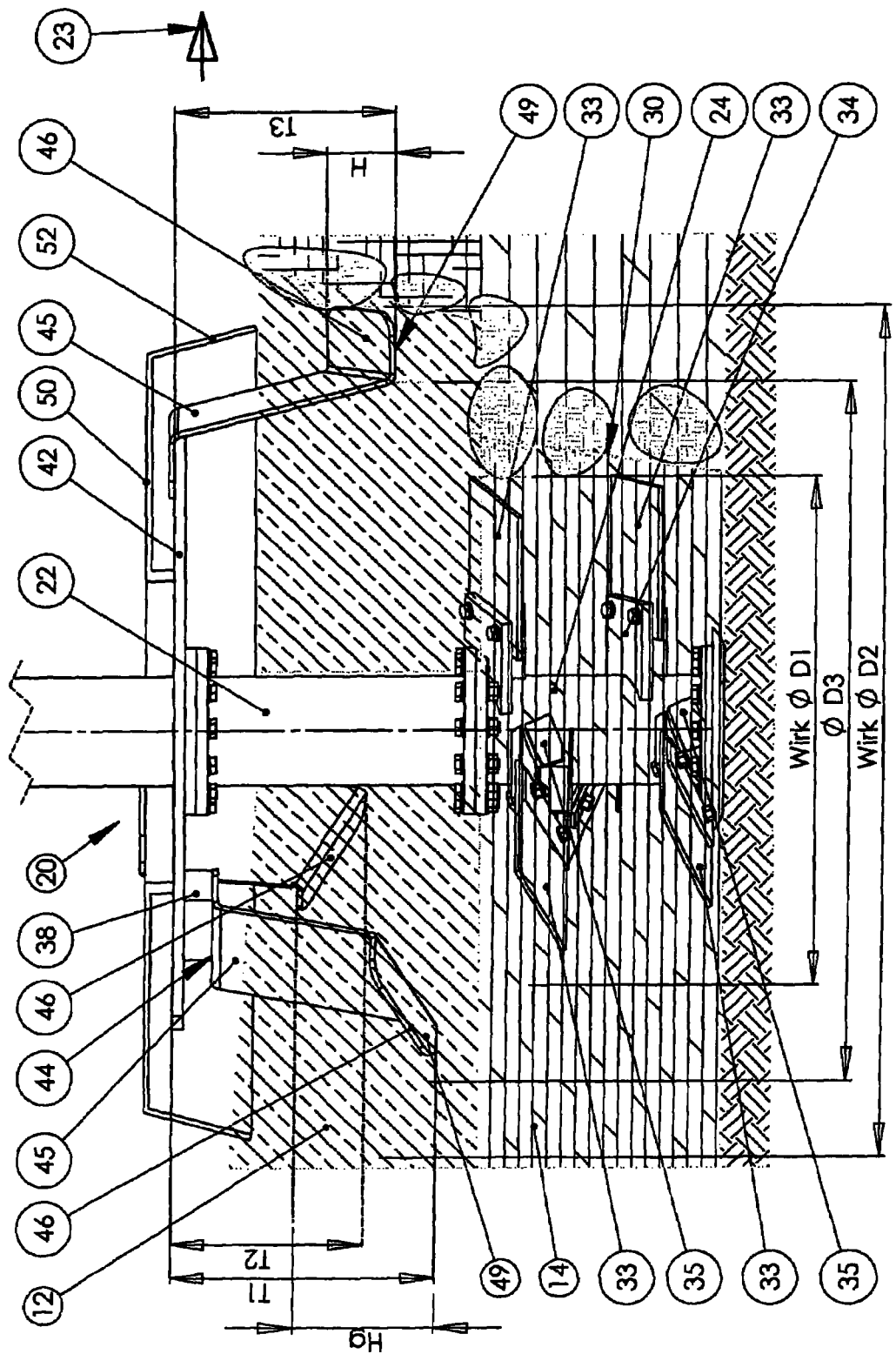
FIG. 4: an enlarged representation of the earth-working apparatus in accordance with FIG. 3, including a comminuting device.

FIG. 4 shows an enlarged view of earth-working apparatus 1 which is being moved in direction 23. Comminuting device 40 is configured above cutter and agitator device 30. Configured between two intermediate shafts 22 is a supporting element 42 in the form of a round plate, on whose top side and, respectively, bottom side, second tools 44 are mounted. Other tools 44 having different effective diameters $D_x$ may be mounted on the bottom side of supporting element 42. In the specific embodiment shown here, these second tools 44 are composed of a downward extending spar 45, on whose bottom end a blade 46 is configured in each case. Blades 46 are plate-shaped and have a slanting orientation.

Second tools 44 all have the same length. The use of spacer elements 38 between spar 45 and supporting plate 42 allows effective depths $T_1$, $T_2$, $T_3$ to be adjusted. These are measured from plate 42 downward to blade tip 49.

In the left portion of FIG. 4, a second tool 44 is mounted on supporting plate 42 via a spacer element 38, so that this tool has an effective depth of $T_1$. Another tool 44 is fastened directly to the bottom side of supporting element 42 and thereby merely has an effective depth $T_2$ that is smaller than effective depth $T_1$. On the right side, a second tool 44 [(sic.) 45] is fastened to the top side of supporting plate 42. This tool has an effective depth $T_3$.

Second tools 44 having different effective depths are configured on a common circle, so that second tools 44 have an effective diameter $D_2$ which is likewise defined by blade tips 49. Effective diameter $D_1$ of cutter and agitator device 30 that is defined by the outwardly extending vane tips, is substantially smaller than effective diameter $D_2$ of comminuting device 40.

Since both cutter and agitator device 30, as well as comminuting device 40 are mounted on common shaft 20, the direction of rotation of first and second tools 32, 44 is identical. Due to the larger effective diameter $D_2$, the speed of second tools 44 is greater than that of first tools 32.

As is illustrated in FIG. 3, earth-working apparatus 1 is jointly driven by hydraulic motors 1' and 1". Because of the ensuing chemical reaction with the conditioning agent and the stepwise action of the vanes of the earth-working apparatus, a crumbly structure of tar or sludge, including conditioning agent, is formed following a brief period of time.

Supporting plate 42 advantageously provides a large rotational mass, which, along with the mounted second tools 44, automatically generates substantial breaking forces to be applied to the clods, without having to overload hydraulic motors 1', 1" or reduction gear 2.

The earth material smashed by comminuting device 40 is fine-grained and, therefore, has a substantially greater liquid absorption capacity than a clod formation as shown in FIG. 3. As a result, the emissions are reduced to a minimum.

Also configured on supporting plate 42 is a bell-shaped dust cover 50 whose diameter is greater than effective diameter $D_2$ of comminuting device 40. In this respect, bell-shaped dust cover 50 spans the entire comminuting device 40. Bell-shaped dust cover 50 has a circumferentially extending skirt 52 which extends into the upper region of second tools 44. Bell-shaped dust cover 50 is preferably made of a flexible material, thereby enabling the bottom edge of skirt 52 to be adapted more effectively to the surface contour of crust 12. The dust formation is held back underneath the bell.

Blade tips 49 of second tools 44 are typically configured to be staggered in height and have a blade height H. Due to the height offset of the blade tips, the intense action results in an effective volume V of approximately $$V = \frac{\pi}{4} \cdot H_g \left( D_2^2 - D\frac{3}{3} \right),$$

given one rotation of comminuting device 40, $H_g$ being the sum of blade heights H.

During operation, the driver of the excavator may use hydraulic motors 1', 1" to select a right and a left rotation of comminuting device 40 and of cutter and agitator device 30. A return travel of earth-working apparatus 1 may be used to shake tacky soil off of tools 32, 44.

When, in addition to the rotational motion, earth-working apparatus 1 is translationally displaced, the classic circular motion changes to a cycloidal motion relative to ground 10. Due to the crumbly structure required for the conditioning process, the translational advance is to be kept as small as possible.

Figure 5:
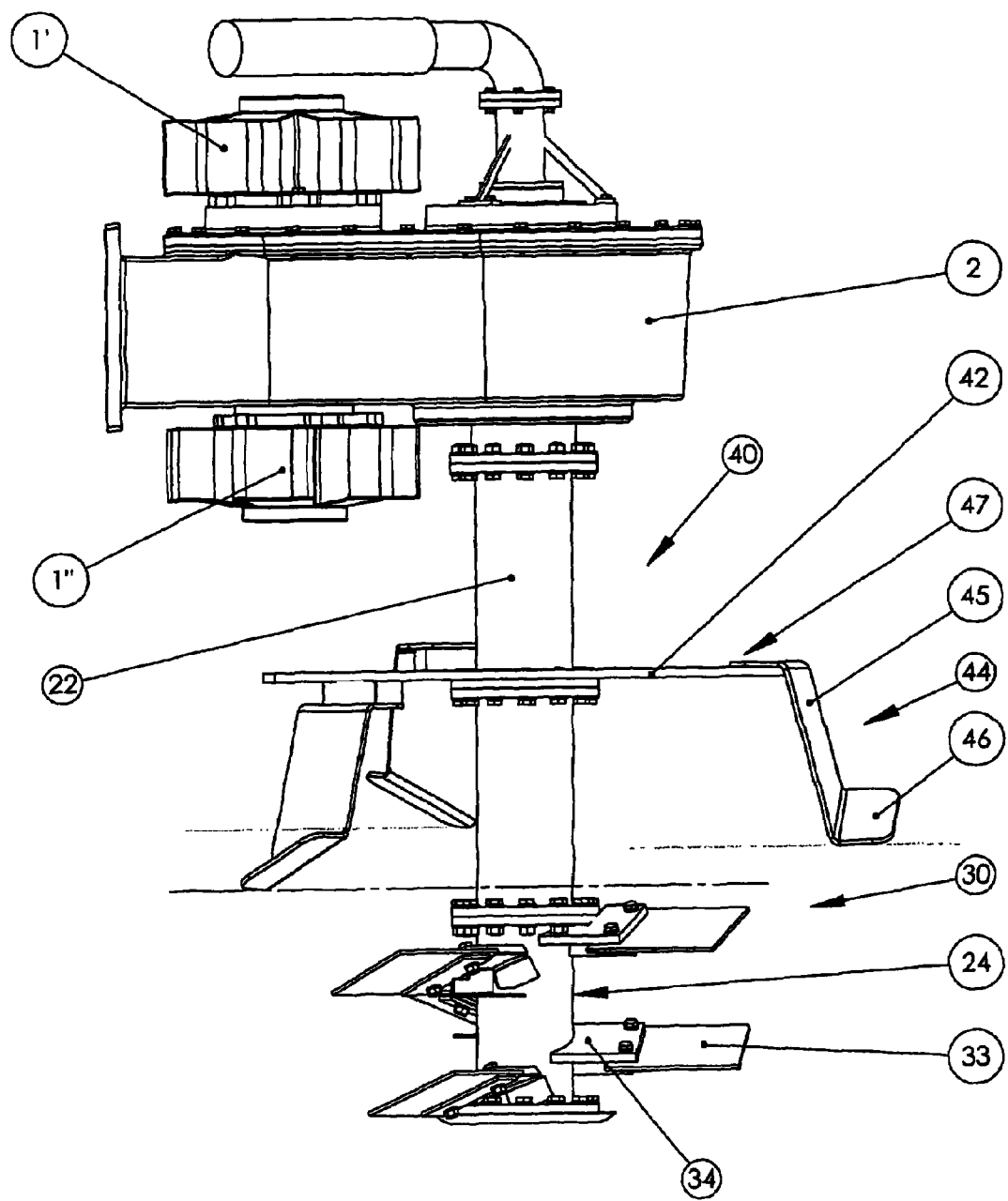
FIG. 5: a lateral view of the earth-working apparatus illustrated in FIG. 4.

In FIG. 5, earth-working apparatus 1 according to FIG. 4 is shown to once again illustrate the individual tools in a side view without ground 10. Second tools 44 are attached to supporting element 42 via a screw connection 47.

Figure 6:
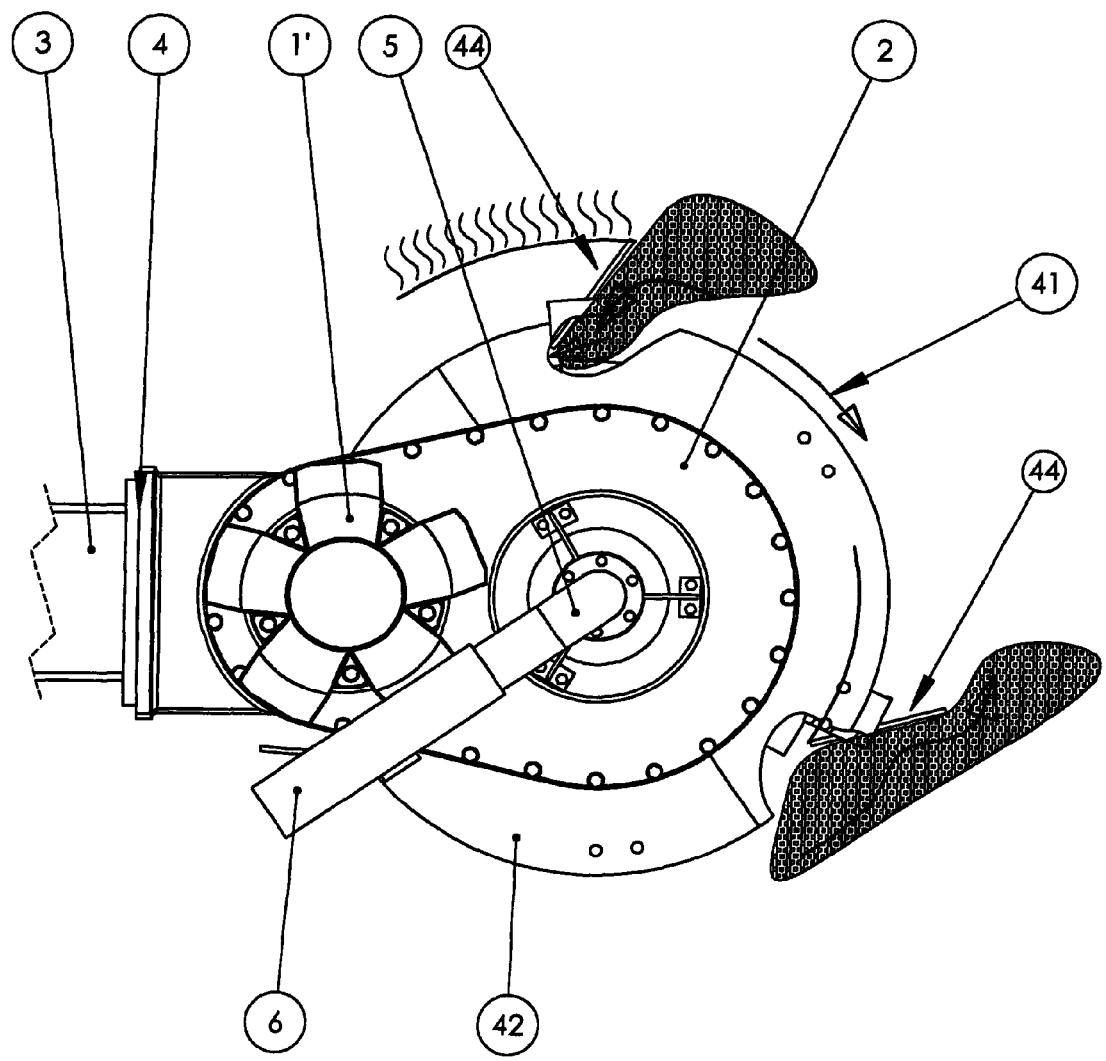
FIG. 6: a plan view of the earth-working apparatus illustrated in FIG. 4.

FIG. 6 shows the plan view of earth-working apparatus 1. The direction of rotation is denoted by reference numeral 41. In the upper representation, second tools 44 are oriented to displace the earth material inwardly. Tool 44, which is drawn in at the bottom right, is oriented to displace the earth material outwardly.

Figure 7:
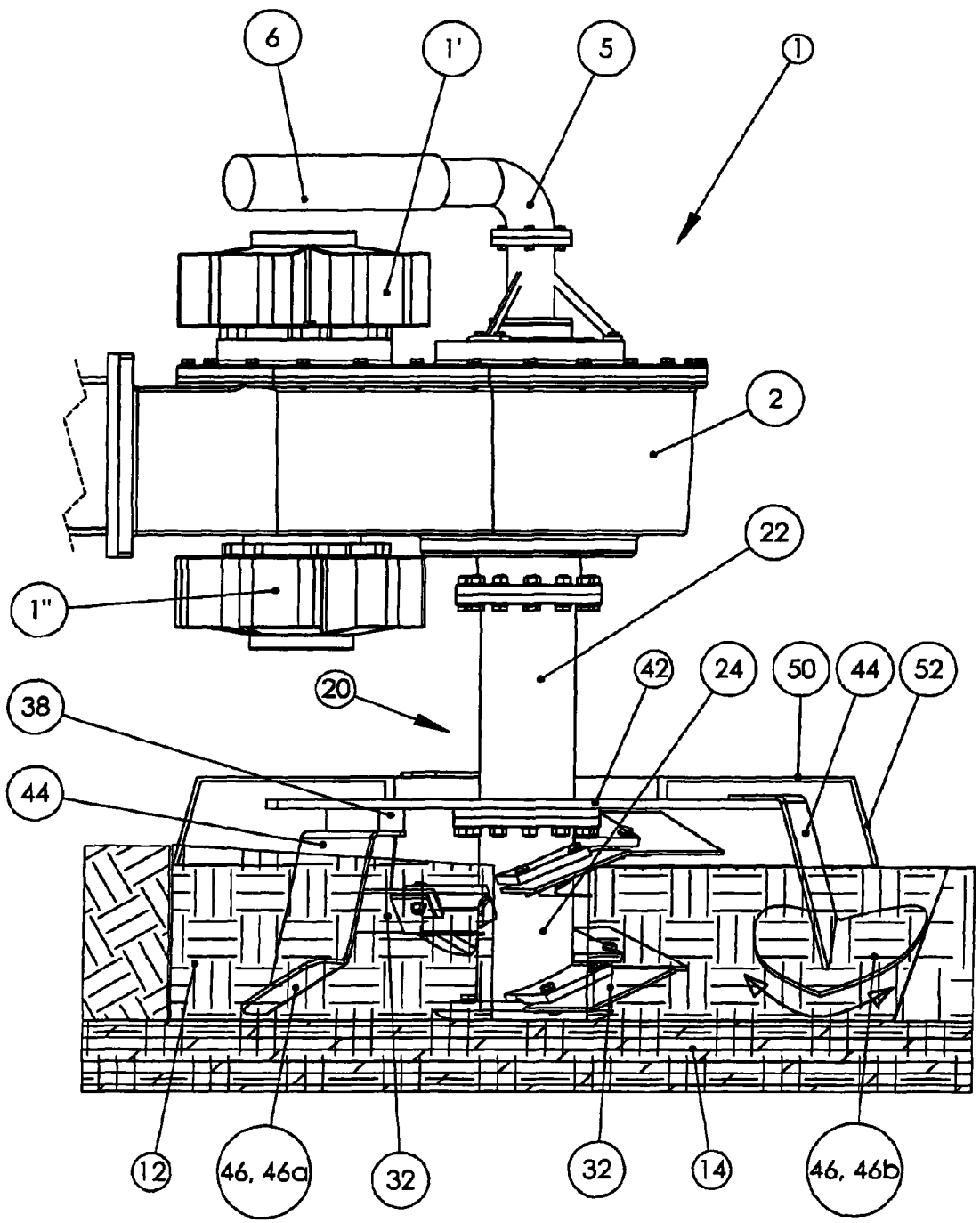
FIG. 7: a sectional view of furrows, including an earth-working apparatus having shortened distances.

FIG. 7 shows another specific embodiment where supporting element 42 is configured directly on the top side of shaft 24 of cutter and agitator device 30. Via its plate 42, comminuting device 40 is, in fact, configured above cutter and agitator device 30, but second tools 44 may extend into the lower region of cutter and agitator device 30. Due to larger effective diameter $D_2$, second tools 44 are configured radially adjacently to vanes 33. In the representation shown here, second tools 44 are each composed of a spar 45 and of a blade 46, either in the form of an obliquely positioned plate 46a or a heart-shaped plate 46b.

Figure 8:
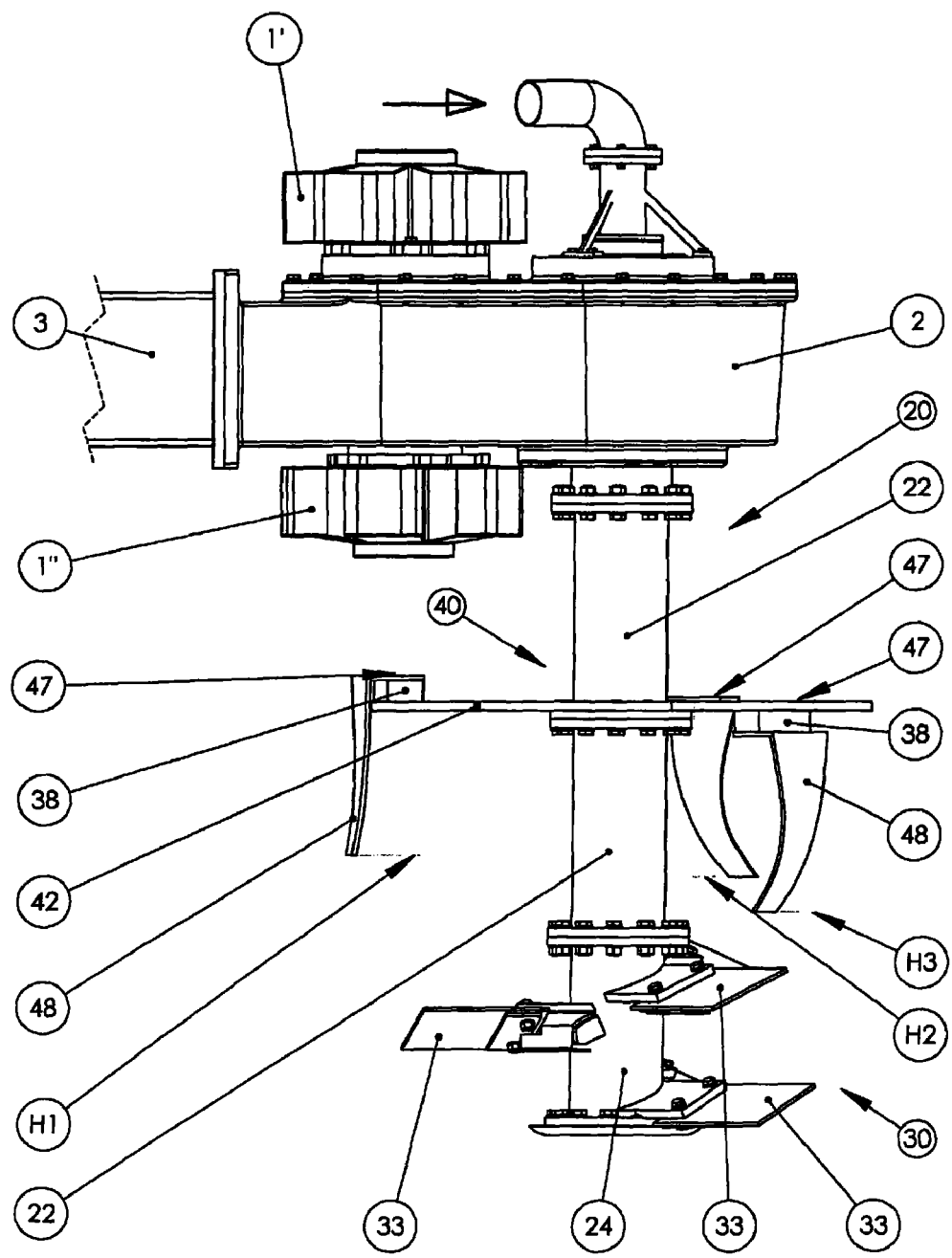
FIG. 8: a lateral view of an earth-working apparatus in accordance with another specific embodiment.

FIG. 8 shows another specific embodiment where second tools 44 are designed as curved cutting edges 48 which are detachably secured by a screw connection 47 to plate 42. Cutting edges 48 may be made of a spring steel and be designed to be outwardly or inwardly curved. The effective depth may be modified by spacer elements 38. Spacer elements 38 may be configured on the top side or bottom side of supporting element 42.

Figure 9:
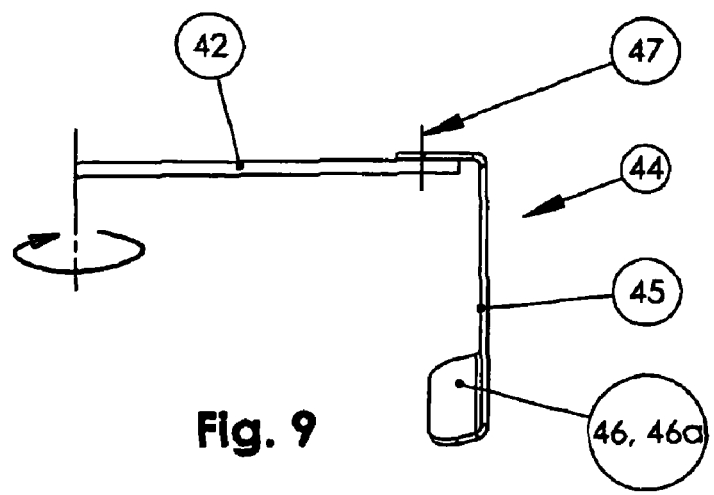
FIG. 9: a supporting plate including a tool in accordance with a first specific embodiment.
Figure 10:
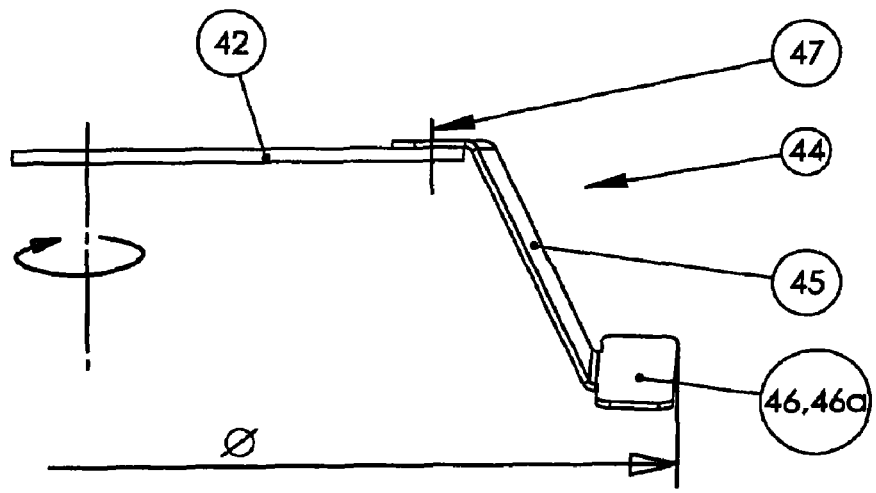
FIG. 10: a supporting plate including a tool in accordance with another specific embodiment.
Figure 11:
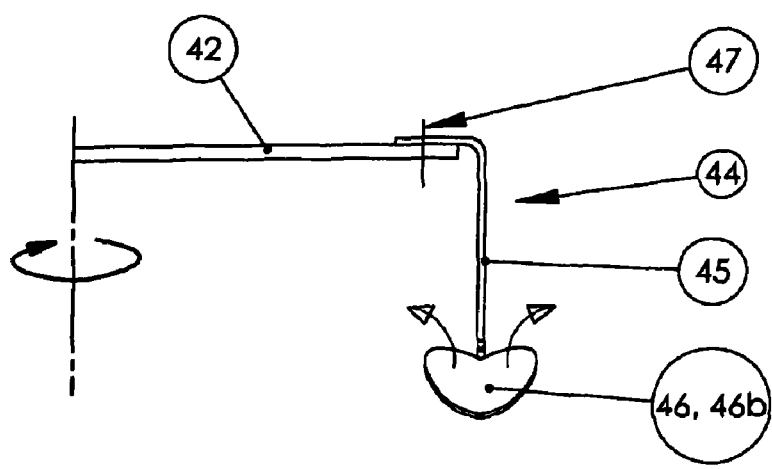
FIG. 11: a supporting plate including a tool in accordance with another specific embodiment.

In FIG. 9 through 11, supporting plates 42 are equipped with various tools 44. In each case, a tool 44 is drawn in representatively.

In FIG. 9, spar 45 is fastened to the top side of supporting plate 42. The spar extends vertically downward and, at the bottom end, has a plate-shaped, inwardly extending blade 46.

FIG. 10 shows another specific embodiment in which spar 45 is angled obliquely outwardly. Plate-shaped blade 46 extends outwardly.

A blade 46 in the form of a heart-shaped plate 46b is configured in FIG. 11.

In FIG. 12a and 12b, second tool 44 is illustrated in the form of a cutting edge 48, when mounted correspondingly on supporting plate 42, an inwardly conveying tool being created.

In FIG. 13a, the same tool is mounted on plate 42 in the opposite sense, so that, as is discernible in FIG. 13b, an outwardly conveying tool is created.

Figure 14:
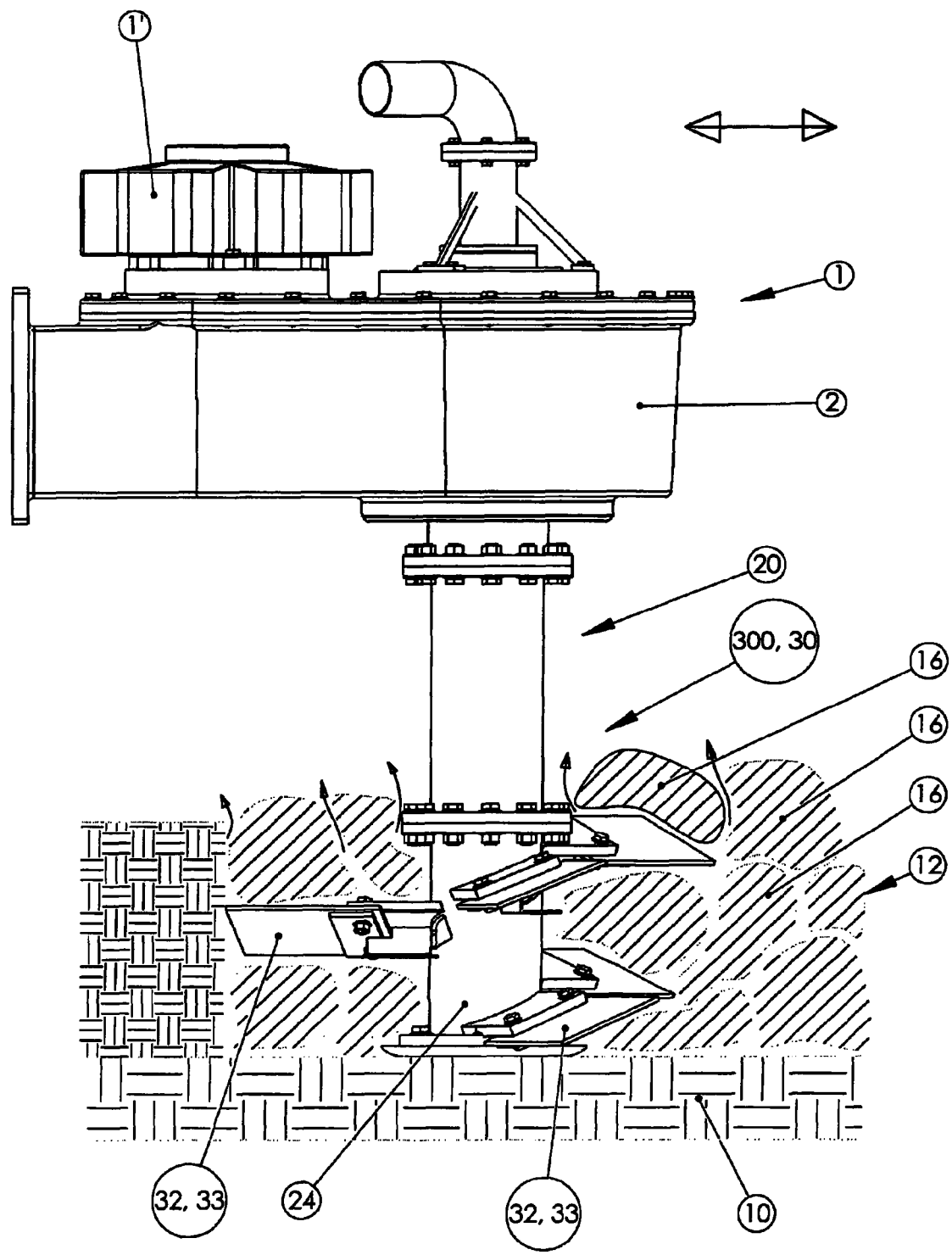
FIG. 14: an earth-working apparatus having a cutter and agitator device.

FIG. 14 shows an earth-working device 1 having only one driving device 1', on which is mounted a first earth-working device 300 in the form of a cutter and agitator device 30. Mounted on reduction gear 2 of driving device 1' is a shaft 20, to whose bottom end, shaft 24 of cutter and agitator device is attached. As already described in connection with FIG. 3 through 5, this cutter and agitator device has first tools 32 in the form of vanes 33. Merely crust 12 of ground 10 is broken up by this device, thereby forming clods 16. The mode of operation of earth-working device 300 corresponds to that just described in connection with FIG. 3.

Figure 15:
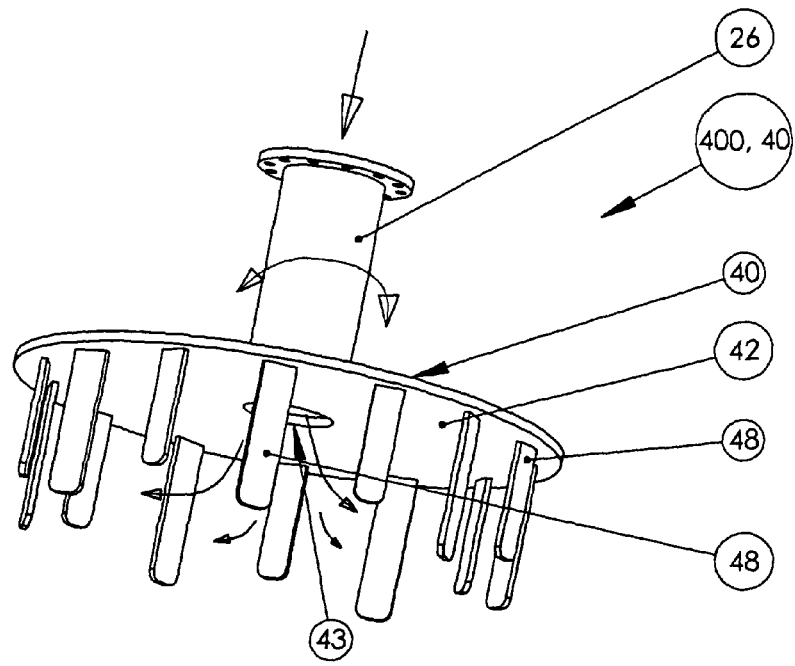
FIG. 15: a second earth-working device in a perspective view.

Once crust 12 has been broken up and clods 16 have been produced, first earth-working device 300 is exchanged for a second earth-working device 400 which is shown in a perspective view in FIG. 15. In the lower region, shaft 24 is replaced by shaft 26 which, along with comminuting device 40, is flange-mounted on shaft 20. Earth-working device 400 may correspond to the comminuting device according to FIG. 5. In the specific embodiment shown here, second tools 44 are made of cutting edges 48 of different lengths. In the center, plate 42 has an orifice 43, making it possible for conditioning agent to be discharged from inside of shaft 26.

The cutting edges illustrated in FIGS. 12a and 13a may also be used, for example.

Figure 16:
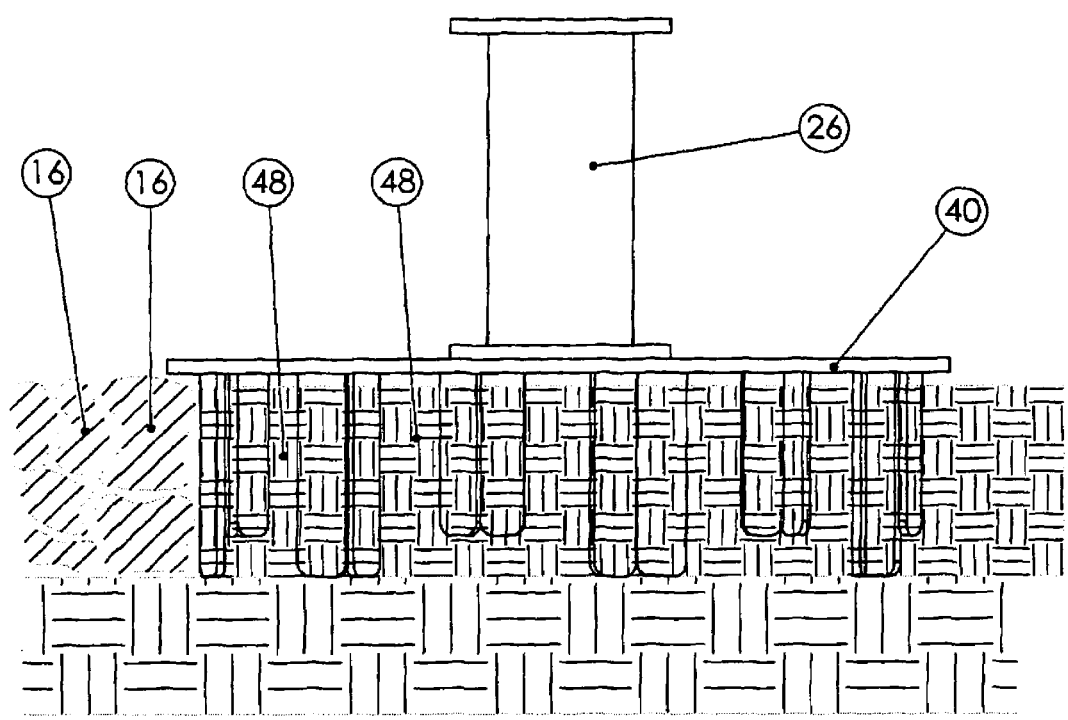
FIG. 16: the second earth-working device in use.

FIG. 16 shows earth-working apparatus 1, earth-working device 400 being in use. It is discernible that clods 16 are converted by comminuting device 40 into a crumbly structure. The separate use of second earth-working device 400 makes it possible for the work duration to be more effectively adapted to the size and properties of clods 16 than is the case when working with the combination device according to FIG. 5.

Figure 17:
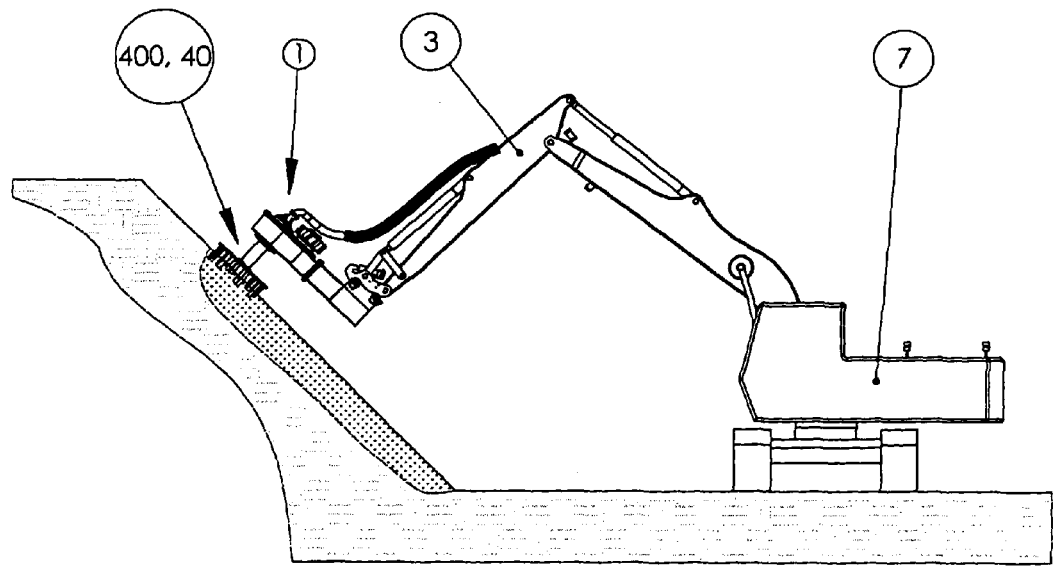
FIG. 17: the second earth-working device including a driveable device.

FIG. 17 shows earth-working apparatus 1 including second earth-working device 400 in connection with driveable device 7. It is discernible in FIG. 17 that this apparatus is also suited for working hillsides.

For example, under difficult conditions for tough applications, an excavator according to FIG. 14 may be equipped to break up the clods or encrustations and another excavator according to FIG. 17 to individually refine the clods. Overall, therefore, a very cost-effective, quality procedure is provided by this approach.

REFERENCE NUMERAL LIST 1 earth-working apparatus
1' upper hydraulic motor
1" lower hydraulic motor
2 reduction gear
3 excavator boom
4 flange mount
5 feed line for conditioning agent
6 hose line for conditioning agent
7 driveable device
8 bulk transporter
10 ground/tar
10a worked area
10b unworked area
12 crust
14 dough-like material
16 clod
18 cracks and fractures
20 shaft
22 intermediate shaft
23 direction of movement of the earth-working apparatus
24 shaft of the cutter and agitator device
26 shaft of the comminuting device
30 cutter and agitator device
32 first tool
33 vane
34 vane mount
35 orifice for conditioning agent and air
36 direction of flow
38 spacer element
40 comminuting device
41 direction of rotation
42 supporting element, plate
43 orifice for conditioning agent and air
44 second tool
45 spar
46 blade
46a plate
46b heart-shaped plate
47 screw connection
48 cutting edge
49 blade tip
50 bell-shaped dust cover
52 skirt
60 curvilinear furrows
62 rectilinear furrows
300 first earth-working device
400 second earth-working device
$D_1$ effective diameter
$D_2$ effective diameter

What is claimed is:

1. An earth-working apparatus having a drive located above the ground comprising:
   at least two earth-working devices,
   a first earth-working device including a rotating cutter and agitator device that penetrates into the ground to be worked, and having first tools, the first tools including angled vanes which are mutually spaced apart in the circumferential and longitudinal direction of the shaft, the angled vanes are configured to penetrate into a crust of the ground; and
   a second earth-working device including a comminuting device having second tools, each earth-working device being mountable on the drive;
   wherein the cutter and agitator device and the comminuting device are mounted on a common shaft, the shaft being configured to be tillable from the vertical.

2. The apparatus as recited in claim 1, wherein each earth-working device is individually mountable on the drive.

3. The apparatus as recited in claim 1, wherein both earth-working devices are jointly mounted on the drive.

4. The apparatus as recited in claim 3, wherein the comminuting device is configured above the cutter and agitator device.

5. The apparatus as recited in claim 1, wherein the comminuting device is a rotating device.

6. The apparatus as recited in claim 1, wherein the cutter and agitator device has a first effective diameter D1, and the comminuting device has a second effective diameter D2, the second effective diameter D2 being greater than the first effective diameter D1.

7. The apparatus as recited in claim 6, wherein due to D2 being>D1, the second tools are configured radially adjacently to the vanes.

8. The apparatus as recited in claim 1, wherein the first tools rotate about at least one common axis.

9. The apparatus as recited in claim 1, wherein the first tools rotate about one vertical axis.

10. The apparatus as recited in claim 1, wherein the second tools rotate about at least one common axis.

11. The apparatus as recited in claim 10, wherein the second tools rotate about one vertical axis.

12. The apparatus as recited in claim 1, wherein the first and second tools rotate about the same axis.

13. The apparatus as recited in claim 6, wherein the first and second tools rotate in the same direction.

14. The apparatus as recited in claim 1, wherein at least one intermediate shaft is configured between the cutter and agitator device and the comminuting device and between the comminuting device and the drive.

15. The apparatus as recited in claim 1, wherein the shaft is a hollow shaft.

16. The apparatus as recited in claim 1, wherein the second tool has a spar and a blade.

17. The apparatus as recited in claim 1, wherein the second tools are configured and designed for inward and outward conveyance relative to the axis of rotation.

18. The apparatus as recited in claim 1, wherein the vanes have an angular position of 20° to 30°.

19. The apparatus as recited in claim 1, wherein the vanes are oriented relative to the rotational direction of the shaft to permit lifting of the earth material.

20. The apparatus as recited in claim 1, wherein at least the cutter and agitator device has discharge orifices for discharging at least one conditioning agent.

21. The apparatus as recited in claim 20, wherein the discharge orifices are provided with spray nozzles.

22. The apparatus as recited in claim 1, wherein the comminuting device includes at least one supporting element extending horizontally from the shaft, the at least one second tool being mounted on the supporting element.

23. The apparatus as recited in claim 22, wherein the supporting element is a plate.

24. The apparatus as recited in claim 22, wherein the second tool extends downward from the supporting element.

25. The apparatus as recited in claim 22, wherein a plurality of second tools, which are configured within at least one effective diameter or at least one effective depth, are provided on the supporting element.

26. The apparatus as recited in claim 1, wherein the second tools are configured and designed for inward or outward conveyance relative to the axis of rotation.

27. The apparatus as recited in claim 16, wherein the blade is configured to slant in the vertical and horizontal direction away from the spar.

28. The apparatus as recited in claim 16, wherein the spar is configured to slant outwardly from top to bottom.

29. The apparatus as recited in claim 16, wherein the blade is configured to slant in the vertical or horizontal direction.

30. The apparatus as recited in claim 16, wherein the blade is a plate.

31. The apparatus as recited in claim 30, wherein the blade is a heart-shaped plate.

32. The apparatus as recited in claim 1, wherein one of the second tools include a blade.

33. The apparatus as recited in claim 22, wherein the at least one second tool is releasably attached to the supporting element.

34. The apparatus as recited in claim 22, wherein the at least one second tool is directly or indirectly attached to the supporting element via spacer elements.

35. The apparatus as recited in claim 3, wherein a bell-shaped dust cover is configured between the comminuting device and the drive.

36. The apparatus as recited in claim 35, wherein the lower rim of the bell-shaped dust cover extends at most to the lower rim of the comminuting device.

37. The apparatus as recited in claim 35, wherein the bell-shaped dust cover is made of a flexible material.

38. The apparatus as recited in claim 1, wherein at least one intermediate shaft is configured between the cutter and agitator device and the comminuting device or between the comminuting device and the drive.

39. The apparatus as recited in claim 1, wherein means for attachment to a horizontally movable device are provided.

40. The apparatus as recited in claim 22, wherein a plurality of second tools, which are configured within at least one effective diameter and at least one effective depth, are provided on the supporting element.

41. The apparatus as recited in claim 1, wherein the drive includes two motors.

42. The apparatus as recited in claim 3, wherein the drive is a motor.

43. A method for working encrusted ground surfaces, comprising
   breaking up the ground surface crust with an earth-working apparatus in a first work operation using a first earth-working device to form clods of earth material, setting in motion the clods of earth material within locally bounded regions, and
   crushing the clods formed when the ground surface crust is broken up within the locally bounded region in at least one second work operation using a second earth-working device;

wherein the breaking up step and the crushing step are carried out in temporal succession;

wherein the first earth-working device is interchanged with the second earth-working device between the breaking up step and the crushing step.

44. The method as recited in claim 43, wherein at least one conditioning agent is introduced while being simultaneously intermixed with the earth material, the conditioning agent being distributed in the vertical or horizontal direction.

45. The method as recited in claim 43, wherein at least one conditioning agent is introduced while being simultaneously intermixed with the earth material, the conditioning agent being distributed in the vertical and horizontal direction.

46. An earth-working apparatus having a drive located above the ground comprising:
    at least two earth-working devices;
    a first earth-working device including a rotating cutter and agitator device that penetrates into the ground to be worked, and having first tools, the first tools including angled vanes which are mutually spaced apart in the circumferential and longitudinal direction of the shaft, the vanes being configured on a helix, at least two vanes being provided per helical turn; and
    a second earth-working device including a comminuting device having second tools, each earth-working device being mountable on the drive;
    wherein the cutter and agitator device and the comminuting device are mounted on a common shaft configured to be tiltable from the vertical.

47. An earth-working apparatus having a drive located above the ground comprising:
    at least two earth-working devices;
    a first earth-working device including a rotating cutter and agitator device that penetrates into the ground to be worked, and having first tools; and
    a second earth-working device including a comminuting device having second tools, each earth-working device being mountable on the drive;
    wherein the cutter and agitator device and the comminuting device are mounted on a common shaft, the shaft being mounted on a drivable device, the shaft being configured to be tiltable from the vertical by said drivable device.

48. An earth-working apparatus having a drive located above the ground comprising:
    at least two earth-working devices;
    a first earth-working device including a rotating cutter and agitator device that penetrates into the ground to be worked, and having first tools; and
    a second earth-working device including a comminuting device having second tools, each earth-working device being mountable on the drive;
    wherein the cutter and agitator device and the comminuting device are mounted on a common shaft, the shaft being mounted on a boom of a drivable device, the shaft being configured to be tiltable from the vertical by said drivable device.

49. An earth-working apparatus having a drive located above the ground comprising:
    at least two earth-working devices,
    a first earth-working device including a rotating cutter and agitator device that penetrates into the ground to be worked, and having first tools, the first tools including angled vanes which are mutually spaced apart in the circumferential and longitudinal direction of the shaft, the angled vanes are configured to penetrate into a crust of the ground; and
    a second earth-working device including a comminuting device having second tools, each earth-working device being mountable on the drive;
    wherein the cutter and agitator device and the comminuting device are mounted on a common shaft, wherein the cutter and agitator device has a first effective diameter $D_1$, and the comminuting device has a second effective diameter $D_2$, the second effective diameter $D_2$ being greater than the first effective diameter $D_1$.

* * * * *